United States Patent Office 3,505,921
Patented Apr. 14, 1970

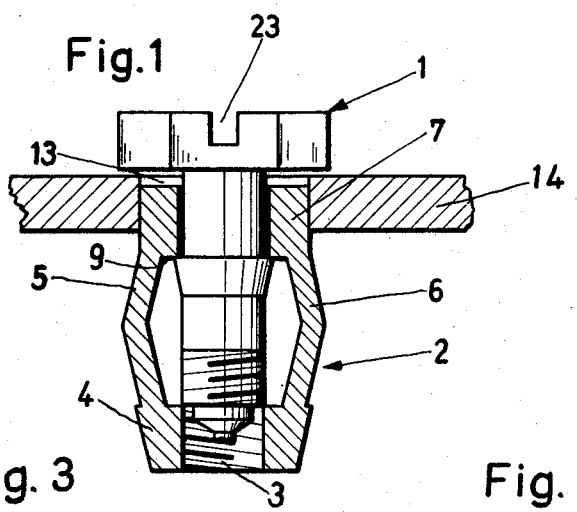
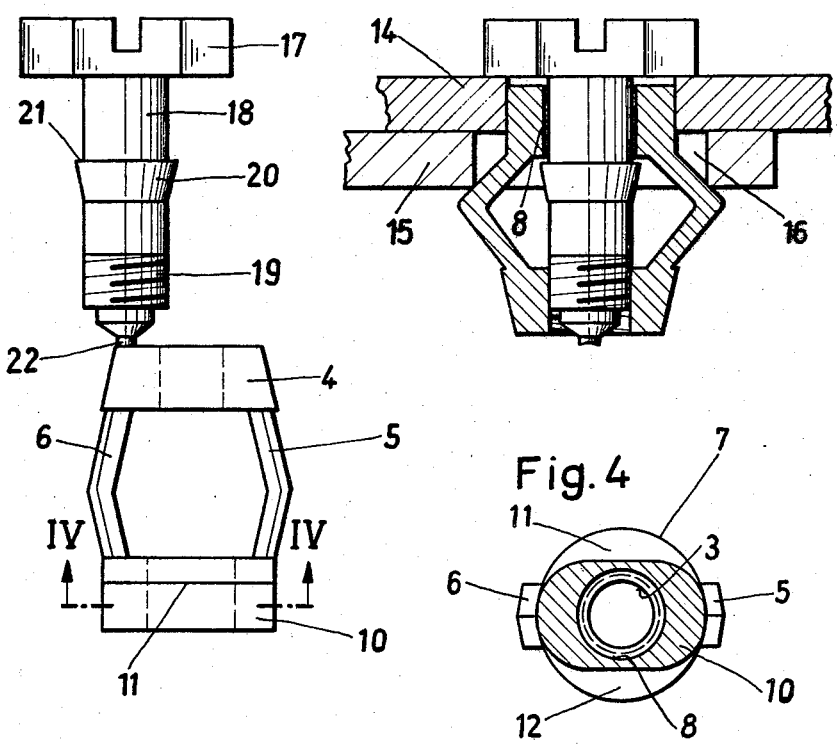

3,505,921
FASTENING DEVICE
Wilhelm Klaus Wigam, Hamburg, Germany, assignor to Illinois Tool Works Inc., Chicago, Ill., a corporation of Delaware
Filed Mar. 21, 1969, Ser. No. 809,359
Int. Cl. F16b *13/06, 13/12*
U.S. Cl. 85—71                                        3 Claims

ABSTRACT OF THE DISCLOSURE

A fastener device for securing two workpieces having openings in registry including a screw threaded member rotatably assembled with a nut by means of a ring connected and axaially spaced from the nut member by a plurality of struts. Rotation of the screw within the nut and movement of the nut towards the screw head expands the struts to secure the two workpieces together.

BACKGROUND

The subject invention concerns a device which fastens two articles together that are provided with openings, one to accept the screw and one to accept a prescribed nut which has on the side that is facing the screw axially orientated spreading struts, the free ends of these struts are connected with a ring that at least partially extends into the opening of the article that the screw passes through and is provided with a means to prevent rotation in the article.

With such known fastening devices the second article is fastened to the first by screwing the screw into the nut. As the nut moves up the thread of the screw the struts that are connected by the ring spread outwardly and press against the outer edge of the opening in the second article and thereby holds the two articles together tightly. When the struts are deformed in this manner for any length of time the elasticity of the strut material will give out and not allow the struts to return to their original position after the screw is removed from the nut and the spread struts would not release themselves from the outer edge of the opening in the second article.

SUMMARY

The purpose of the invention is to make a fastening device whose spreading struts of the nut, by the screwing out of the screw from the nut, automatically stretch themselves, hence are returned to their original form. To obtain this objective according to the invention the shank of the screw is provided with a radial running stop that faces the head of the screw which is located, from the free end of the screw thread, a distance that is somewhat larger than the thickness of the connecting ring of the struts facing the head of the screw. By unscrewing the screw from the nut the connecting ring braces against the radial stop and thereby by further turning of the screw causes the struts to stretch.

Another feature of the invention is that the stop ring on the shank of the screw can be tapered towards the stop surface. Thereby the diameter of the stop ring can be larger than the inner diameter of the connecting ring that the screw shank enters. Thereby after the screw is inserted through the connecting ring of the struts, which has a somewhat smaller inner diameter than the outer diameter of the stop ring, the conical surface of the stop ring causes the connecting ring of the struts to expand. After the stop ring passes through the inner diameter of the connecting ring, through the elasticity of the material, it returns to its original diameter and the screw is captivated in the nut and cannot be separated.

To prevent the turning of the part that consists of the nut, struts and connecting ring when the screw is screwed into the nut, the invention has another feature, the cross section of the connecting ring is different than a circle and the opening in the article that the screw passes through has the same cross section form as the connecting ring.

In conclusion another feature of the invention is that the screw and nut with its struts and connecting ring can be produced as one piece from plastic. The screw is connected to the nut by a thin easily breakable web. This way the screw and the nut with its struts and connecting ring are one piece and cannot be separated before actual use. To use the fastening device only a little side pressure is required to separate the two parts.

DESCRIPTION OF DRAWING

The drawing shows an application example of the invented fastening device. The drawing shows:

FIG. 1 is an elevational view in partial section of the fastening device as inserted in mounted relation in the opening of a first article;

FIG. 2 is an elevational view similar in section to FIG. 1, however the screw has been screwed into the nut and the struts have been spread to retain the second article;

FIG. 3 is an elevational view of the fastening device in initial molded relationship before separation of screw and nut; and FIG. 4 is a cross-sectional view taken along line 4—4 of FIG. 3.

DESCRIPTION

The fastening device shown in the drawing for fastening two apertured articles together includes two parts; namely, screw 1 and nut part 2. Nut part 2 includes nut 4 with an internal thread 3.

From part 4 extend two axial struts 5, 6, whose free ends are connected with a ring 7. The struts are shown slightly bent outwardly approximately in the middle of their length. Ring 7 and nut 4 lay parallel to each other in such a way that the middle axis of opening 8 of ring 7 is in line with the internal thread 3. The free ends of struts 5, 6 are connected with ring 7 on its circumference as one piece so that surface 9 facing the nut is formed. The side of the ring facing away from nut 4 has part 10 that is suitable for insertion into an opening in an article. This part has, which can be seen best in FIG. 4, a cross section that differs from a circle. Thereby diametral opposite surfaces 11, 12 are created on ring 7 and by inserting part 10 in a matching opening 13 in an article 14 the surfaces lay against the sidewall. This cannot be readily seen in the drawing because the large radial extension of 10 of ring 7 and the surfaces 11 and 12 are in front and behind of the cross section. Nut part 2 of the fastening device is made from a flexible material, it must be flexible enough so that when nut 4 approaches ring 7 struts 5, 6 spread outwardly and after a short spreading will return to their original position, whereby nut 4 and ring 7 move apart to their original position. Normally longer spreading struts 5, 6 would not return to their original position.

Nut 4 in the example of the fastening device shown in the drawing is tapered towards ring 7 to provide ease of insertion in the opening 16 of article 15 that is to be fastened to article 14.

Nut part 2 has a screw 1 associated with it. The screw has a head 17 and a cylindrical shank 18 which on its free end is threaded 19 to match internal thread 3 of nut 4. Between thread 19 and head 17 the shank of the screw 18 has a band 20. The surface of band 20 facing the head of the screw 17 is located at right angles to the center axis of the screw and forms striking surface 21. The diameter of band 20 at striking surface 21 is somewhat larger than opening 8 in ring 7. From this end band 20 tapers towards screw thread 19. This taper eases the insertion of the band through the smaller opening 8 in ring 7. The location of band 20 with striking surface 21 on shank 18 is such, that the distance of striking surface 21 from the free end of screw thread 19 is a little larger than the distance of surface 9 facing the ring 7 connecting the struts, from nut 4. Through this arrangement when the screw is screwed out of the nut striking surface 21 lays against surface 9 of ring 7 and by further unscrewing of screw 1 out of nut 4 struts 5, 6 are stretched to substantially their initial position. The location of striking surface 21 from head 17 of screw 1 is dependent on the thickness of article 14 that contains opening 13 in which part 10 of nut part 2 is inserted. As shown in the sketch the two articles 14, 15 are fastened together by inserting part 10 of nut part 2 of ring 7 into opening 13 that matches in cross section part 10 until surfaces 11, 12 rest against one surface of article 14. Then the screw is inserted from the other side of the article through opening 8 in ring 7 screw thread 19 first, until screw thread 19 rests against nut 4. Since the distance of striking surface 21 from the free end of screw thread 19 is somewhat larger than the distance from surface 9 to nut 4, striking surface 21 of band 20 still lies in opening 8 of ring 7. By screwing in screw thread 19 into the internal thread 3 of nut 4 band 21 is pulled through opening 8 completely. Now striking surface 21 butts against the face of ring 9. By screwing out screw 1 and removing screw thread 19 completely from internal thread 3 of nut 4 struts 5, 6 are stretched a little. When the fastening device is attached to article 14 as described, then article 15, that is to be fastened to it, can be pushed over the nut part 2 through hole 16 until both articles 14, 15 rest against each other. By turning screw 1 in the sense of screwing in screw thread 19 into internal thread 3 of nut 4 screw thread 19 enters internal thread 3 of nut 4, thereby surfaces 11, 12 as shown in the sketch rest against one surface of article 15, head 17 of screw 1 lays against the opposite surface of the article 15 and nut 4 approaches ring 7. The struts 5, 6 are thereby spread outwardly and their outer sides press against the edge of hole 16 of article 15. Thus, the two articles are pressed together tightly as shown in FIG. 2 of the sketches.

If after a longer period of time it is necessary to separate objects 14 and 15, because of the invented fastening device it is only necessary, to turn the head of screw 1 in the sense of unscrewing the screw out of nut 4. Then if the elasticity of the material, that the nut part 2 is made from, is not sufficient to stretch struts 5, 6, striking surface 21 of band 20 rests against surface 9 of ring 7. By continuing to turn screw thread 19 out of internal thread 3 of nut 4 it moves nut 4 away from ring 7 until screw thread 19 is completely unscrewed from the nut and its free end rests against the nut. By moving nut 4 from ring 7 struts 5, 6 are stretched and thereby object 15 can easily be removed from nut part 2 of the fastening device. Since opening 13, that accepts screw 1, in article 14 has the same cross section as part 10 of ring 7 when the screw is turned nut part 2 will not turn.

In order to also have the two parts connected together before they are inserted in object 14 screw 1 and nut part 2 can be molded in one piece, as shown in FIG. 3 of the sketches, from suitable deformable materials, i.e., thermoplastics such as nylon etc. Therefore a one piece fastening device is at hand until just before it is used and the thin connecting web 22 is broken and the two parts are separated. Screw 1 is connected by thin web 22 on the end of nut 4 that faces away from ring 7, thereby after breaking thin web 22 none of the striking surfaces of nut part 2 are damaged or deformed. Head 17 of screw 1 is shown as a hexagon head and also is pictured with slot 23 which indicates that the screw can be turned with a wrench or a screw driver although other driving means are contemplated.

What is claimed is:

1. A device for fastening together at least two articles that are provided with aligned openings comprising a screw having an enlarged head and a shank including a threaded end portion opposite said head, a threaded nut which has attached on the side facing the screw head axially oriented spreading struts, the ends of said struts remote from said nut being connected to a ring that is received on the screw shank and is adapted to at least partially extend into an opening in the first of the articles, and said ring provided with external means to prevent rotation in said first article, the shank of said screw including an integral radial band fixed at an axial location thereon and having an annular shoulder which defines a striking surface that faces the head of the screw, the axial distance from said band to the free end of the screw thread being greater than the axial distance of said connecting ring from said nut, the maximum diameter of the band being somewhat larger than the diameter of the opening that accepts the screw shank in the ring whereby said ring is captively mounted between said band and the screw head and whereby the retrograde rotation of said screw out of said nut presses said striking surface against said connecting ring and by continuing to turn said screw out of said nut the struts are stretched to release the device.

2. A fastening device as claimed in claim 1 wherein said striking surface includes a conical band that encircles the shank of the screw with the striking surface facing the head of the screw.

3. A fastening device as claimed in claim 1, wherein said screw and nut with struts and ring are molded from plastic material in one piece and the free end of screw thread is connected to ring on the side that faces away from nut by a thin easy breakable web.

References Cited

UNITED STATES PATENTS

| 1,278,615 | 9/1918 | Eary | 151—68 X |
| 2,017,421 | 10/1935 | Post | 85—71 |
| 2,956,468 | 10/1960 | Macy | 85—72 |
| 2,964,989 | 12/1960 | Croessant | 85—71 |
| 3,313,083 | 4/1967 | Flora | 85—72 X |
| 3,400,627 | 9/1968 | Raynovich | 85—70 |

FOREIGN PATENTS 444,623   3/1936   Great Britain.

RAMON S. BRITTS, Primary Examiner

U.S. Cl. X.R.

85—72; 151—68, 69